United States Patent [19]

Geropp

[11] Patent Number: 5,407,245
[45] Date of Patent: Apr. 18, 1995

[54] PROCESS AND DEVICE FOR REDUCING THE DRAG IN THE REAR REGION OF A VEHICLE, FOR EXAMPLE, A ROAD OR RAIL VEHICLE OR THE LIKE

[75] Inventor: Dieter Geropp, Wilnsdorf/Obersdorf, Germany

[73] Assignee: Daimler-Benz AG, Stuttgart, Germany

[21] Appl. No.: 679,053
[22] PCT Filed: Nov. 7, 1989
[86] PCT No.: PCT/DE89/00702
  § 371 Date: Feb. 5, 1993
  § 102(e) Date: Feb. 5, 1993
[87] PCT Pub. No.: WO90/05084
  PCT Pub. Date: May 17, 1990

[30] Foreign Application Priority Data
  Nov. 7, 1988 [DE] Germany .................... 38 37 729.2

[51] Int. Cl.⁶ ............................................. B62D 35/00
[52] U.S. Cl. .................. 296/180.1; 296/185; 296/208
[58] Field of Search ............... 296/180.1, 185, 91, 296/208

[56] References Cited

U.S. PATENT DOCUMENTS

| | | | |
|---|---|---|---|
| 2,037,942 | 4/1936 | Stalker | 296/185 X |
| 2,242,494 | 5/1941 | Wolf | 296/91 X |
| 3,591,229 | 7/1971 | Wilfert et al. | 296/208 |
| 4,393,852 | 7/1983 | Merritt et al. | 123/564 |
| 4,460,055 | 7/1984 | Steiner | 296/180.1 X |
| 5,184,832 | 2/1993 | Miwa | 296/198 |

FOREIGN PATENT DOCUMENTS

| | | | |
|---|---|---|---|
| 916198 | 11/1946 | France . | |
| 1168556 | 12/1958 | France . | |
| 649343 | 8/1937 | Germany . | |
| 1456066 | 1/1970 | Germany . | |
| 3230640 | 2/1984 | Germany | 296/180.1 |
| 3230641 | 2/1984 | Germany | 296/180.1 |

Primary Examiner—Dennis H. Pedder
Attorney, Agent, or Firm—Evenson, McKeown, Edwards & Lenahan

[57] ABSTRACT

A device for reducing drag in a rear region of a vehicle by extracting air through openings in a rear wall by blowers and blowing the air through further openings located a line of separation of the vehicle.

9 Claims, 4 Drawing Sheets

PROCESS AND DEVICE FOR REDUCING THE DRAG IN THE REAR REGION OF A VEHICLE, FOR EXAMPLE, A ROAD OR RAIL VEHICLE OR THE LIKE

The invention relates to a process for reducing the drag in the rear region of a vehicle, for example, a road or rail vehicle or the like.

In addition, the invention relates to a device for carrying out this process.

The development of energy-saving and ecologically harmless vehicles, particularly motor vehicles for road traffic or railbound vehicles, mainly requires a reduction of their drag. As tests have shown in the field of motor vehicle dynamics, large-area flow separations may occur on different regions of the vehicle shell inducing intensive swirling movements. Such physical occurrences are connected with high energy dissipations which, in turn, represent the causes of high air resistances but also of undesirable lift forces with respect to a vehicle.

The important region where the undesirable flow conditions are particularly obvious is the whole rear region of a vehicle. It is known that the largest proportion of the drag of, for example, a motor vehicle, is the pressure resistance which, for example, in the case of a modern passenger car, may amount to more than six times the proportion of the frictional resistance. This drag is decisively determined by the separated, intensively swirled flow region, the so-called eddying zone, in the rear region of the vehicle.

From the German Patent Document No. 649 343, a flow retarder for high-speed motor vehicles is known which provides that air blown out toward the longitudinal direction of the vehicle is extracted in the rear region of a vehicle. As a result of this measure, the author of this patent document wants to achieve a deceleration of the vehicle.

An opinion was expressed with respect to the above-mentioned patent document in the journal *Motorkritik*, Year 1941, Pages 223, and on, under the heading "Air Resistance Helps Deceleration". The opinion states in detail on Page 256 that the view expressed at the time by the author of the patent document was incorrect and explains in detail that ... on the contrary, the air resistance is reduced because, as a result of the air extraction, a form of boundary layer suction takes place and as a result a longer adhering of the flow or a reduction of the swirl drag is achieved.

The invention is based on the object of further developing a process, in which air is blown out and sucked in again in the rear region of a vehicle, in such a manner that a reduction of the total resistance of the vehicle is achieved. In addition, the invention is based on the object of providing a device by means of which the process according to the invention can be carried out efficiently.

Because of the interaction between the process measures a, b and c according to the invention, that is, because of the interaction of tangential boundary layer blowing-out, of the Coanda effect and of boundary layer suction, an at least partial suppression of the eddying zone is obtained in the rear region and thus a considerable reduction of the drag of the vehicle.

It is known that the "Coanda effect" is the characteristic of fluid jets (liquid or gas jets) to place themselves on fixed walls situated in the proximity and flow along them, the fluid jet being deflected from its original propagating direction.

As a result of the process according to the invention, first a targeted blowing-out of air therefore takes place in the area of the separating line(s) of the vehicle rear, specifically at a relatively high speed. Secondly, the Coanda effect is utilized which provides in particular that the flow places itself against a curved surface, the flow taking place against or around it. Thirdly, the air is finally sucked again from the eddying zone. This combination of measures causes the achieving of the overall effect; i.e., Bernoulli's total pressure in the rear region is increased, and as a result the pressure resistance and therefore the overall drag is reduced or minimized sufficiently.

The speed of the blown-out air jets is set sufficiently high, particularly to approximately 50 m/sec.; i.e., higher than the ambient speed so that the Coanda effect can be properly utilized. For this purpose, it is provided in certain embodiments that the blown-out and sucked in air is guided in a regulated or controlled air circulation. Preferably, the delivery quantity and/or the distribution of the blown-out and extracted air is regulated and controlled.

The attached description of embodiments in connection with the drawings has the purpose of explaining the invention, its further characteristics and advantages in detail.

In this case,

Figure 1:
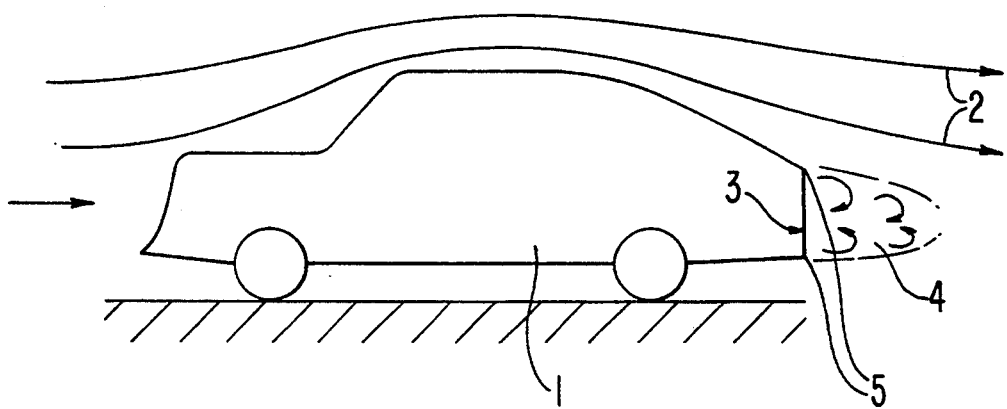
FIGS. 1–3 are each schematic lateral views of a passenger car model with the schematic representation of the so-called "rear separations"
Figure 2:
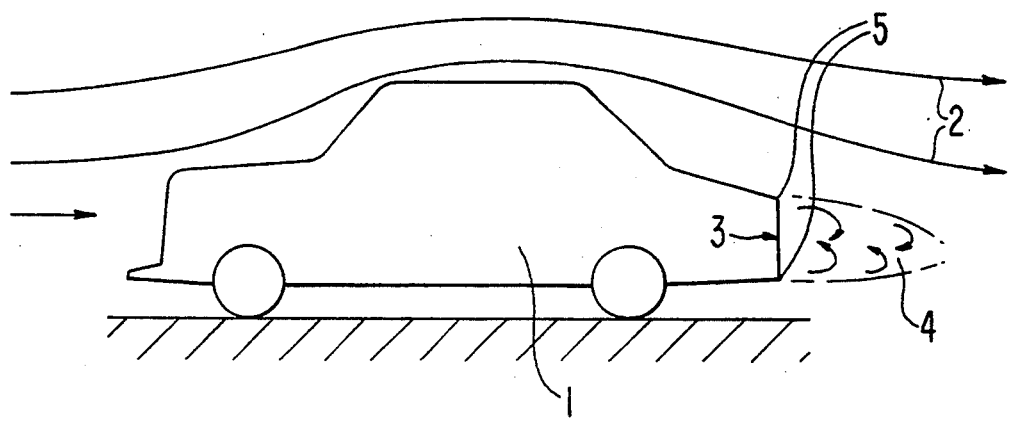
Figure 3:
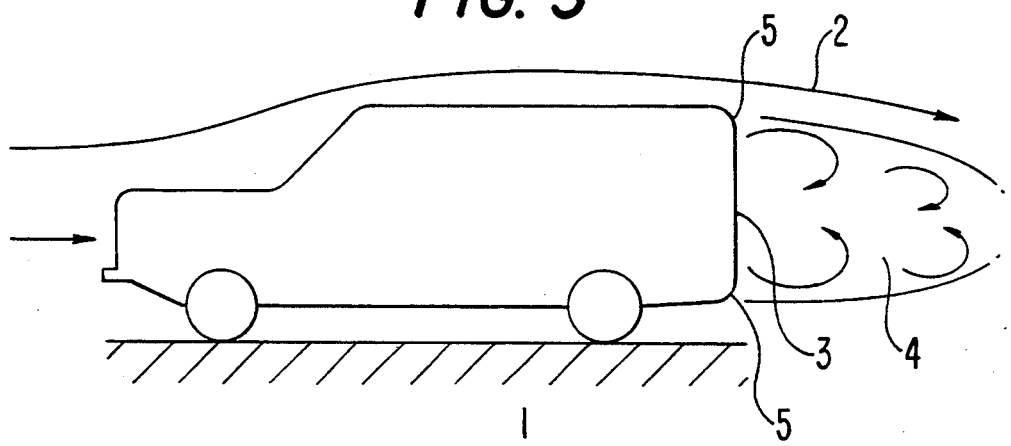

The schematic representations according to FIGS. 1–3 are each based on the assumption that a passenger car 1 moves forward on a roadway and in the process is exposed to an outer flow 2.

The passenger car 1 according to FIG. 1 is constructed as a fast back model in which, particularly in the area of a vehicle rear 3, that is, virtually behind this vehicle rear 3, an eddying zone 4 occurs, that is, a strongly swirled flow zone in the rear region of the motor vehicle 1. In a similar manner, FIG. 2 shows a passenger car 1 in the form of a notchback model, and FIG. 3 shows a passenger car 1 in the form of a full back model, in both cases, corresponding eddying zones 4 being present also in the rear region.

In all three cases, this eddying zone 4 is characterized by a separating line 5 which continues over the top side and the bottom side as well as the lateral regions of the vehicle rear 3, this separating line 5 defining the start of the eddying and of the high energy dissipation, that is, the conversion of kinetic flow energy into heat. Because of the separation and the energy dissipation, the static pressure in the eddying zone 4 will not rise further and will remain almost constant. As a result, a high drag is generated and thus a correspondingly high drag of the respective vehicle.

Figure 4:
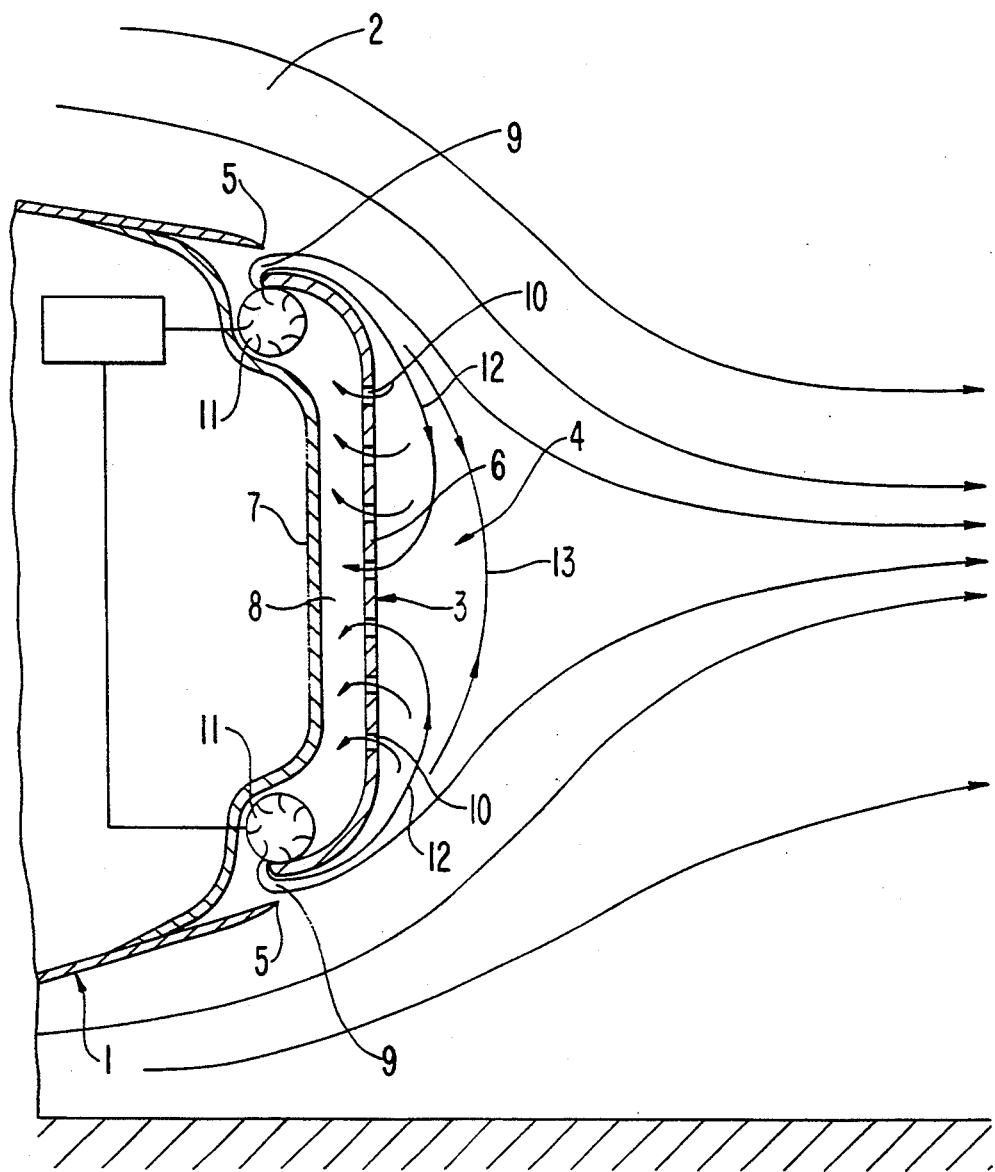
FIG. 4 is a schematic sectional view of a rear region of a motor vehicle which is equipped with the device according to the invention in a first embodiment.

FIG. 4 is a schematic representation of a sectional view of a rear region of a passenger car 1, this rear region having a device for the intensified reduction of the drag.

In the case of this device, particularly in the area of separating line 5 of the vehicle rear 3, first openings 9 are arranged in the form of blow-out slots which serve the blowing-out of air at a high velocity; i.e., they therefore serve the so-called boundary layer blowing-out.

In addition an exterior wall 6 of the vehicle rear 3, which is adjacent to the eddying zone 4, is constructed and shaped in such a manner that the blown-out air, while utilizing the Coanda effect, is deflected from its original flow direction into the eddying zone 4, as indicated by the arrows 12. In addition, in this device, second apertures 10 are arranged in the exterior wall 6 of the vehicle rear 3, that is in the tailgate wall, which are used for the suction of air from the eddying zone 4, that is, for the so-called boundary layer extraction.

In a preferred manner, the first openings 9 as well as the second openings 10 are each constructed in the shape of bores or slots or in a similar manner. In the shown embodiment according to FIG. 4, the first openings 9 are constructed as elongated blow-out slots which are arranged at upper and lower edge areas of the tailgate wall 6, that is, in each case, in the region of the separating lines 5. The second openings 10 that is, the extractor apertures, according to FIG. 4, are constructed in the form of bores or holes or slots which are arranged so that they are distributed over the surface of the tailgate wall 6.

Furthermore, in a space 8, which is provided between the exterior wall or the tailgate wall 6 and an interior wall 7 of the vehicle rear 3, two blowers 11 are provided, preferably in the form of cross-flow blowers, which provide the required energy supply in order to ensure the blowing-out and the suction with respect to the boundary layer. These two blowers 11 are arranged in the proximity of the first openings or blow-out slots 9 and are therefore used, on the one hand, for the delivery of the blow-out air through the first openings 9 and, on the other hand, for the delivery of the sucked in air through the second apertures 10 into the interior of the space 8.

The blowers 11 in the form of cross-flow blowers, are preferably adapted to the respective slot length of the first openings or blow-out slots 9. An exhaust gas turbine 28 can be used to drive the blowers 11, as indicated in FIG. 4.

Figure 6:
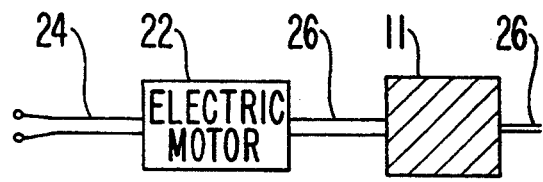
FIG. 6 is a schematic view of an electric motor flanged to a shaft of a blower in accordance with an embodiment of the present invention.
Figure 7:
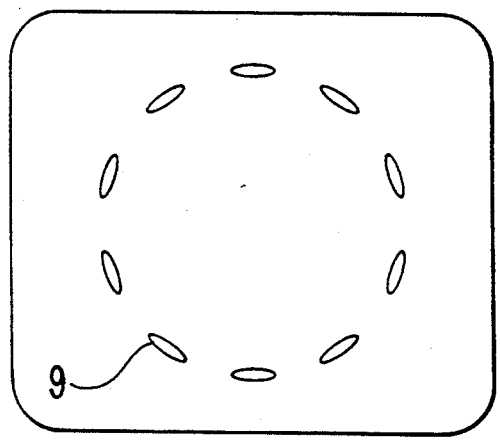
FIG. 7 is an end view of a tailgate wall according to an embodiment of the present invention.

In other embodiments, for the drive of these blowers 11, electric motors 22 are provided. As shown in FIG. 6, the electric motors 22 are being connected to the electric wiring 24 of the passenger car 1 and are preferably flanged laterally to the shafts 26 of the blowers 11.

Thus, when the operation of the blowers 11 is started, air is blown out to the outside at a high velocity of approximately 50 m/sec. through the first openings of blow-out slots 9 in the area of the separating lines 5. As a result, kinetic energy is supplied to the considerably decelerated boundary layer and a separation is at first avoided. The pressure in the area of the vehicle rear 3 can therefore rise further. In addition, the air emerging from the blow-out slots 9, at the connecting rounded wall region of the exterior wall or the tailgate wall 6, while utilizing the Coanda effect, experiences a deflection from the original tangential direction into the eddying zone 4. In a preferred manner, the ratio of the height of one blow-out slot 9 respectively to the bending radius of the rounded wall section of the exterior wall 6 is significantly smaller than 1. By means of this Coanda effect deflection, energy is also supplied to the eddying zone 4 and the sound outer flow 2 is deflected into the rear region with high kinetic energy. The flows of the top and bottom side as well as of the lateral regions of the vehicle rear 3, which are deflected from all sides and are enriched with kinetic energy by the blowing-out through the first openings or blow-out slots 9, meet in a stagnation line 13 in the rear region, whereby the static pressure is increased significantly and the drag is therefore reduced.

The supply of kinetic energy as a result of the blowing out of air through the first openings or blow-out slots 9 as well as the flow deflection because of the Coanda effect is now still intensified by the fact that, in addition, by way of the exterior wall or tailgate wall 6 bordering on the eddying zone 4, air is sucked in by the second apertures 10 situated there and is sucked into the interior of the space 8.

Figure 5:
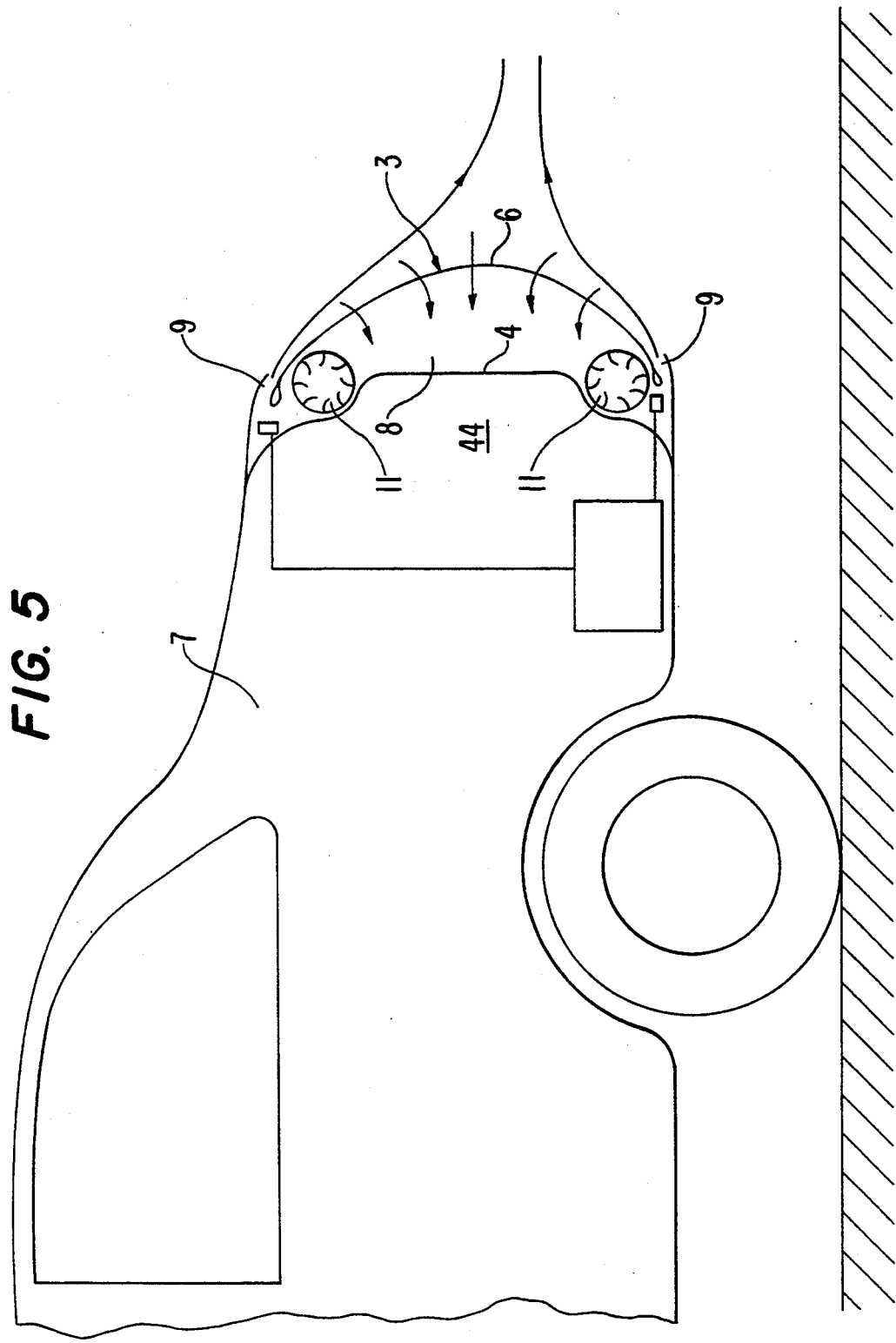
FIG. 5 is a schematic lateral view of a rear part of a a notchback passenger car, a device according to a second embodiment being arranged in its rear region.

The embodiment of a device for reducing the drag in the rear region of a vehicle shown in FIG. 5 is modified with respect to the embodiment according to FIG. 4 to the extent that now the exterior wall 6 of the vehicle rear 3 of a notchback passenger car 1, that is, the tailgate wall, in its region which follows the upper and lower blow-out slots 9, is curved convexly toward the outside. Such an outwardly arched tailgate wall results in another flow-promoting effect because this convex curvature does not result in any excessive deflection of the outer flow, whereby the necessary blow-out and suction output and thus the output of the blowers 11 can be reduced. Furthermore, an outwardly arched tailgate wall has an advantageous effect on the designing of the vehicle body shape in the rear region.

Also in the embodiment according to FIG. 5, the blowers 11 arranged in the space 8 between the exterior wall 6 and the interior wall 7 of the vehicle rear are each constructed as cross-flow blowers which are installed along the whole slot lengths of the blow-out slots 9 and, because of their small transverse dimensions and their high pressure numbers, are very advantageous. These cross-flow blowers, which are practically used for the supply of energy, take in the air in the same manner as illustrated in FIG. 4, by way of intake apertures or bores in the convexly curved exterior wall 6 or tailgate wall of the vehicle rear 3 and then blow out the air through the two blow-out slots 9 in the region of the separating lines of the vehicle rear 3 at a high velocity (approximately 50 m/sec.) (boundary layer blowing-out).

Subsequently, because of the outwardly convexly curved exterior wall 6 of the vehicle rear 3, the blown-out air, while utilizing the above-explained Coanda effect, is deflected from its original flow direction into the eddying zone bordering on the exterior wall 6 from which the air is then sucked in again (boundary layer suction).

Figure 8:
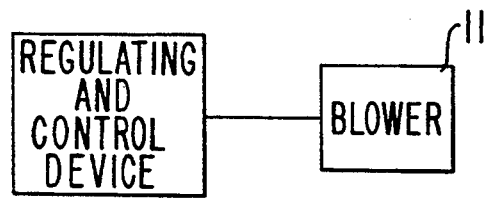
FIG. 8 is a schematic block diagram illustrating the regulating and control device coupled with the blower.

Furthermore, there is also the possibility shown schematically in FIG. 8, to provide additional regulating and control devices by means of which the air circulation of the air blown out and sucked in by means of the blowers 11 can be regulated or controlled, in which case, particularly by means of such regulating devices perhaps the delivery quantity of the blown-out and sucked in air is regulated and, by means of corresponding installations in the first openings 9 (blow-out openings) and the second openings 10 (extractor apertures) is distributed and controlled in such a manner that the eddying zone 4 in the rear region can be influenced in a targeted manner.

As an alternative to the drive of the blowers 11 by means of electric motors, there is also the possibility to implement the blower drive by means of an exhaust gas turbine installed in the motor vehicle with which the blower will then be coupled.

Another alternative solution is that, for the energy supply, that is, for the delivery of the blow-out and the extraction air, instead of blowers, an exhaust gas turbocharger is coupled directly with the device according to the invention. Such a solution suggests itself particularly in the case of motor vehicles with rear engine drive. The reason is that, as known, during full-load operation of the engine, a part of the useful turbo-output must be delivered to the environment by way of a by-pass valve in order to avoid an overstraining of the engine by excessive charge pressure. However, the full-load operation of the engine is identical with the high driving speed of the motor vehicle at which the provided influencing of the flow by the simultaneous blowing-out and suction and thus the reduction of resistance DRAG is most effective.

In the case of this energy supply, it must, however, be ensured in every case that the driving energy required for the delivery of the blow-out and suction air, that is, the energy put into the device according to the invention is less than the energy saved as the result of the achieved reduction of the drag in the rear region.

Finally, there is also the possibility (shown in FIG. 8) that, for achieving a regulated and controlled air circulation of the blown-out and sucked in air, GUIDE VANES 32, 34 are also provided which are assigned to the first openings 9 (blow-out openings) and/or to the second openings 10 (extraction apertures).

Another improvement of the endeavored effect can also be achieved by providing a given number of first openings 9 which are constructed in the shape of blow-out slots, particularly with blowers 11 assigned to them, these blow-out slots being arranged in the perpendicular as well as in the horizontal direction and thus surrounding the vehicle rear 3 in a substantially ring shaped fashion (FIG. a.

In particular, the following advantages are achieved by means of the present invention:

Considerable reduction of the vehicle drag;
Decrease of the drive assemblies of the vehicle;
No change of the outer body contour so that the general usefulness and the suitability with respect to traffic of a passenger car or of a truck are not diminished;
Possibility of retrofitting old vehicles with the device according to the invention;
Saving of fuel;
Less harm to the environment.

The process as well as the device according to the invention can mainly be used very advantageously in the case of passenger cars, trucks with a box body as well as buses, but, in addition, may also be used, for example, in the case of rail vehicles, such as high speed trains.

In the case of vehicle constructions with a "cut-off rear", the device according to the invention is particularly effective.

Another possibility of an economical use of the influencing of the boundary layer consists in the coupling of the device according to the invention with the ventilating system of the passenger compartment or the connection of the suction and blow-out zones in the rear region with sites on the vehicle body at which high underpressures or overpressures occur, for example, in the wheel house.

It is claimed:

1. A device for reducing drag in a rear region of a vehicle by increase of Bernoulli's total pressure in the rear region, the rear region having a separating line and an eddying zone, the device comprising:
   first openings at the separating line, said first openings providing initially tangential blown-out air for a kinetic energy increase of the eddying zone;
   an exterior wall at the rear region of the vehicle and which borders on the eddying zone, the exterior wall having a shape such that said blown-out air, while utilizing the Coanda effect, is deflected from an initial flow direction into the eddying zone;
   second openings in said exterior wall through which air from the eddying zone is sucked; and
   blowers for blowing the blown-out air through the first openings and for sucking the air through the second openings, wherein at least one of the blowers is a cross-flow blower corresponding to a slot length of one of the first openings.

2. A device according to claim 1, wherein the exterior wall is convexly curved outwardly in an area connecting the exterior wall to the first openings.

3. A device according to claim 2, wherein the first openings are located in edge regions of the exterior wall, and wherein the second openings are distributed over the surface of the exterior wall.

4. A device according to claim 3, further comprising a space between an interior wall of the vehicle rear and the exterior wall, wherein the blowers are located in said space in proximity to the first openings.

5. A device according to claim 1, further comprising regulating and control devices for regulating and controlling of a delivery quantity of the blown-out and sucked air.

6. A device according to claim 1, wherein the blowers have shafts, and the device further comprises at least one electric motor connected to the blowers for driving the blowers, said electric motors being connected to electrical wiring of the vehicle.

7. A device according to claim 1, further comprising at least one exhaust gas turbine coupled to the blowers, wherein the exhaust gas turbine drives the blowers.

8. A device according to claim 1, wherein the first openings are shaped as blow-out slots and have respective blowers, the blow-out slots perpendicularly and horizontally surrounding the vehicle rear in a substantially ring-shaped manner.

9. A device according to claim 2, wherein the first and second openings are slots, the first openings being arranged in edge regions of the exterior wall, and the second openings are distributed over the surface of the exterior wall.

* * * * *